UNITED STATES PATENT OFFICE.

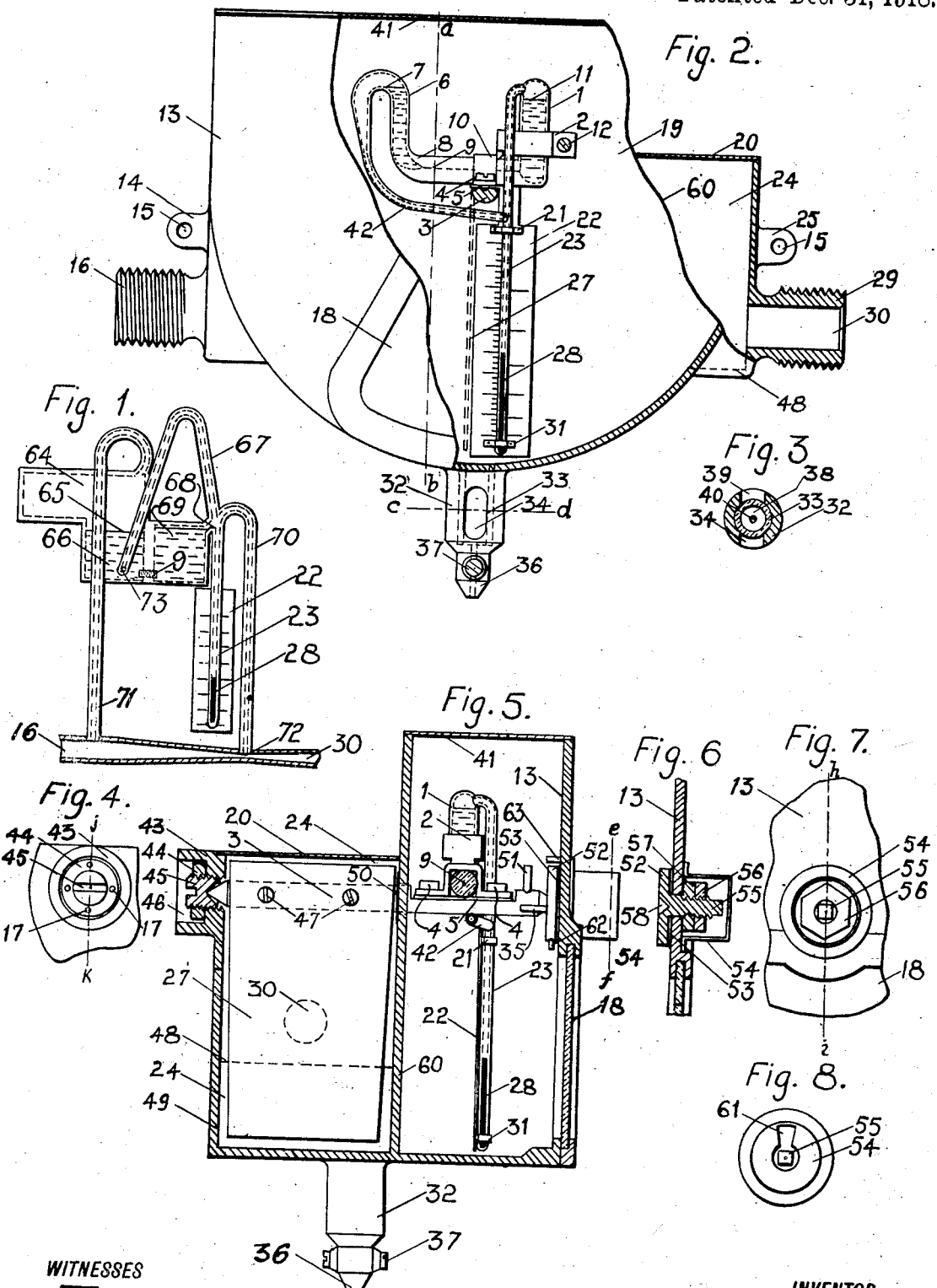
A. P. LITTLE.
METHOD AND MEANS FOR INDICATING THE MAXIMUM FLOW OF FLUIDS.
APPLICATION FILED MAY 5, 1917.
1,289,486.
Patented Dec. 31, 1918.
WITNESSES
INVENTOR
Arlington P. Little.

ARLINGTON P. LITTLE, OF WASHINGTON, DISTRICT OF COLUMBIA.

METHOD AND MEANS FOR INDICATING THE MAXIMUM FLOW OF FLUIDS.

1,289,486.

Specification of Letters Patent.

Patented Dec. 31, 1918.

Application filed May 5, 1917. Serial No. 166,600.

*To all whom it may concern:*

Be it known that I, ARLINGTON P. LITTLE, a citizen of the United States, residing at Washington, District of Columbia, have invented certain new and useful Improvements in Methods and Means for Indicating the Maximum Flow of Fluids, of which the following is a specification.

My invention relates to maximum demand or flow indicating meters in which a differential pressure due to the flow of a fluid causes the displacement of a liquid (contained in what for the purposes of this specification I call the "indicating device"), a portion of which becomes entrapped in an indicating or index tube; the object of my invention is to obtain an instrument which will indicate the maximum rate of flow of a fluid such as water, gas, during any period of time.

Throughout these specifications, the term "fluid" refers to the fluid whose maximum rate of flow is to be indicated by the meter, and the term "liquid" refers to the liquid contained in the indicating device.

In the accompanying drawings which illustrate two forms of my invention, similar numerals refer to similar parts throughout the several views.

Figure 1 is a somewhat diagrammatic view of one form of my invention in which the differential pressure due to the flow of a fluid is transmitted directly to the liquid in the indicating device.

In Figs. 2 to 8 inclusive I illustrate a form of my demand meter as I prefer to construct it wherein the differential pressure due to the flow of a fluid acts on a movable vane, the movement of said vane causing a tilting or rotating action to be imparted to the indicating device. Fig. 2 shows a front elevation of this form of meter with a portion of the front of case and of the partition cut away. Fig. 3 shows a section through the oil gage at the line *c—d* of Fig. 2. Fig. 4 is an elevation of the rear bearing. Fig. 5 shows a vertical section through the meter at the line *a—b* of Fig. 2. Fig. 6 shows a vertical section through front bearing and front bearing cover cut away at the line *e—f* of Fig. 5. Fig. 7 is a front view of front bearing cover and keyway. Fig. 8 is a detail front view of the front bearing cover.

In Fig. 1. 16 is the inlet and 30 is the outlet of a passage through which the fluid flows whose maximum rate of flow is to be measured. The passage here shown is a conical tube commonly known as a Venturi tube having a throat, or portion of relatively small diameter, at 72. As is well known a fluid flowing through such a passage will cause a difference in pressure to be set up between the throat and portions of larger sectional area. The tube 72 which opens into the Venturi tube 16—30 serves to transmit the pressure existing at the large end of the Venturi tube to the vessel or chamber 64 and thence to the liquid 66. Similarly, the tube 70 serves to transmit the pressure existing at the point 72 to the vessel or chamber 69. When a fluid, such as a gas flows through the passage 16—30, the pressure transmitted by the tube 71 will exceed that transmitted by the tube 70, and therefore the liquid 66 will tend to flow through the restricted passage 9 (in the illustration a porous plug is shown) into the vessel 69 until the pressure on the surface 65 of the liquid in the vessel 64 is equal to the combined pressure on the surface of the liquid in the vessel 69 plus that produced by the difference in level of the upper surfaces of the liquids in the vessels 64 and 69. If said flow continues after the vessel 69 has been filled to the level of the shoulder 68, it is evident that the excess liquid entering this vessel will overflow at the shoulder 68 into the index tube 23 and become entrapped therein as at 28, and the extent of such overflow may be measured in convenient units or steps by means of the scale 22. The more rapid the flow of fluid through the passage 16—30 the greater will be the difference in pressure between the vessels 64 and 69 and therefore the amount of liquid over-flowing into the index tube 23 will be greater if said differences in pressure are continued for equal lengths of time. The height of the liquid in the index tube 23 will therefore be proportional (though not necessarily directly) to the rate of flow of the fluid continued over a period of time.

The meter may be reset by revolving the meter counter-clockwise through slightly more than 90°, that is, until the closed end of the index tube 23 is higher than its open end. The liquid in the index tube will then flow by gravity first to fill the vessel 69 and the surplus will pass through the tube 67 into the chamber 64 through the opening 73.

On returning the instrument to its normal position the instrument will be in a condition to begin a new operation.

In Fig. 2, 13 is the front of the case of the meter in which the glass or other transparent medium 18 permits the scale 22 and the index tube 23 to be seen. 60 is a partition which separates the front chamber 19 from the rear chamber 24. The vane 27 is attached to the shaft 3 and when a fluid flows through the rear chamber said vane and shaft are thereby given a limited angular motion in a vertical plane at right angles to the axis of said shaft, the extent of such motion depending upon the rate of flow of said fluid. Attached to the shaft 3 by screw 4 is the vertical clamp or band 10 which serves to secure the tube 8 in position with respect to the shaft 3. The horizontal band or clamp 2 is attached to the vertical clamp 10 and holds the vessel 1 in a definite position with respect to the shaft 3. The screw 12 serves to clamp the horizontal band firmly around the vessel 1. The index tube 23 is closed at its lower end and at its upper end opens into the vessel 1. The tube 8 having the restricted passage 9 connects vessel 1 with the tube 6, and the tube 42 joins the tube 6 with the index tube 23. 16 is the inlet to the rear chamber or passage 24 and 30 the outlet from said chamber or passage. 20 is the top cover of the rear chamber 24. 41 is the top cover of the front chamber 19. 14 and 25 are lugs which may be used to secure the instrument in proper position by means of screws passing through the holes 15, 15.

The upper end of the scale 22 is bent back and said end is secured to the shaft 3 by means of the screw 4. The upper clip 21 and lower clip 31 serve to hold firmly together the scale 22 and index tube 23. The indicating device is partly filled with a suitable liquid, the overflow of which into the index tube 23 under conditions hereinafter described, serves to indicate the maximum flow of fluid through the meter. The motion of the vane 27 (caused by the flow of fluid through the rear chamber 24) is transmitted to the shaft 3 and thus to the indicating device consisting of parts 1, 6, 8, 23, and 42. This motion serves to lift the level of the liquid in vessel 1 above the level of the liquid in vessel 6 and therefore the liquid in vessel 1 tends to flow through the restricted passage 9 into the vessel or enlargement 6. After vessel 6 has become filled with liquid through this operation, any further flow into said vessel 6 will cause an overflow over the bend or shoulder 7 into the tube 42 and thence into the index tube 23 where it becomes entrapped. 28 represents such entrapped liquid.

Fig. 3 is a sectional view, along the line c—d of Fig. 1, of an oil gage or trap. 33 is the transparent lining of the oil basin 38, 34 is the front window or opening and 39 the rear window or opening, 40 is a hole connecting the oil basin 38 with the tip 36, through which any oil contained in said basin 38 would flow on opening the cock 37. The object of the oil basin or trap 38 is to drain out and collect any condensate which might form in the rear chamber 49, when said meter was used in connection with some fluid such as manufactured gas.

Fig. 4 is a rear view of the rear bearing 45 and its accessories. 17, 17 are holes or indentations in the lock nut 44 and serve to assist in its rotation when a proper tool is applied.

Fig. 5 is a vertical section through a—b of Fig. 2 except the rear bearing which is shown as a section through j—k of Fig. 4. The vane 27 is secured to the shaft 3 by the screws 47. The rear bearing 45 and the front bearing 52 serve to keep the shaft 3 in the proper position with respect to the meter case and to permit rotation of said shaft. The nut 44 serves to clamp rear bearing 45 in position. The projection 43 on the rear wall of the meter case serves to protect the rear bearing. The space 46 in said projection may be filled with some substance such as wax for the purpose of sealing the rear bearing after adjustment. 49 is the rear wall of the rear chamber 24, and 20 is the top cover of this chamber. 41 is the top cover of the front chamber 19. The object of the washer 50 is to prevent an excessive flow of gas from the rear chamber 24 to the front chamber 19 through the opening in the partition 60 through which the shaft 3 passes. The radial pin 51 projects from the shaft 3. The horizontally projecting pin 35 and the radial pin 62 are secured to the front bearing 52. On rotating the front bearing 52 in a counter-clockwise direction the pin 35 engages pin 51 and further counter-clockwise rotation of said bearing will cause the shaft and all parts attached thereto to rotate, which movement is of service in resetting the instrument. The pin 63 is secured to the front of the instrument case 13 and the pin 62 projects radially from the front bearing 52. When the front bearing is rotated counter-clockwise through a definite angle the pin 62 will engage pin 63 and prevent further rotation of the front bearing in that direction.

Fig. 7 is a front view on the front bearing, the bearing cover 54 being cut away on the line e—f of Fig. 5.

Fig. 6 is a section through the front bearing and a portion of the meter cover on the line h—i of Fig. 7. In Figs. 6 and 7, 13 is the front cover of the meter, 52 is the front bearing, 53 a gasket which prevents leakage of gas around said bearing, 54 the front casing of bearing, 55 is the front end of the front bearing, 57 is a nut capable of rotating on that portion of the front bearing which projects through the front of meter casing. 56 is a clamp nut to secure nut 57 in position and 58 is the cone bore of front bearing into which the front end of shaft 3 is placed and in which it may rotate freely.

In Fig. 8, which is a front view of the front bearing cover 54, 61 is the keyway into which a suitable key may be inserted and engage the end of the front bearing projection 55. Rotation of said key in a counter-clockwise direction will cause rotation of front bearing and said key would ordinarily be used when it was desired to reset the meter.

In carrying my invention into effect I may employ, either as a part of the meter or external thereto, the Venturi tube or partitioned chamber herein specifically described or any other passage or device suitable for the purpose. The flow of the fluid may be confined wholly or partly to such passages or such flow may be relatively unconfined as wind, stream of water. The differential pressure incident to such flow may be caused to act directly on the surface of the liquid in the indicating device of the meter or said pressure may be transmitted to the indicating device by any known means.

For the purpose of causing a time lag in indicating the rate of flow in excess of a previously indicated rate of flow and to limit the indication to a rate of flow maintained more or less continuously during an interval of time such as 10 seconds, 30 minutes, I employ a restricted passage (such as a capillary tube, minute orifice, porous plug, porous diaphragm), that is, a passage offering a relatively high resistance to the flow of the liquid from one vessel to the other, under the normal conditions of operation of the meter.

In connection with my invention I may, when desired, employ any known means for compensating for temperature error, of shielding the instrument from variations of temperature, and I may employ any known means of preventing the liquid in the indicating device from evaporating. I may also provide any known means for compensating for evaporation of this liquid and for preventing it from absorbing foreign matter.

What I claim is—

1. An indicator of the character described, comprising two vessels containing a liquid, said vessels being connected by a flow-restricting passage; a channel or passage through which the fluid flows whose maximum rate of flow is to be indicated, said flow causing a differential pressure in operative relation to said vessels, which causes a movement of liquid through said flow-restricting passage, an indicating tube connected to said vessels, and means acted upon by the said differential pressure to elevate one of said vessels with respect to the other.

2. An indicator of the character described, comprising two vessels containing a liquid, said vessels being connected by a flow-restricting passage, a channel or passage through which the fluid flows whose maximum rate of flow is to be indicated, said flow causing a differential pressure which causes a movement of liquid through said flow-restricting passage, means acted upon by said differential pressure to elevate one of said vessels with respect to the other, and a receptacle to receive the overflow of liquid from the lower vessel, substantially as described.

3. An indicator of the character described, comprising two vessels containing a liquid and connected by a flow-restricting passage, a passage through which a fluid flows, said flow resulting in a differential pressure, means acted upon by said differential pressure to cause movement of liquid from one vessel to the other vessel through said flow-restricting passage, a receptacle to receive overflow from the latter vessel and a tube connecting said overflow receptacle to the first of the vessels, substantially as described.

4. An indicator of the character described, comprising two vessels containing a liquid, said vessels being connected by a flow-restricting passage and one of said vessels being adapted to overflow, a passage through which the fluid flows whose maximum rate of flow is to be indicated, said flow producing a differential pressure, means acted upon by said differential pressure to cause a movement of liquid through said flow-restricting passage, a receptacle to receive said overflow from one of said vessels, a tube connecting said overflow receptacle to the other of the vessels, a support for the vessels and tubes and a casing or box to which the support is pivoted, substantially as described.

5. In a maximum flow indicating device, the combination of a conduit for the flow of fluid to be measured, having means therein for receiving differential pressures of the said fluid, means acted upon by said pressure receiving means, means for holding a supply of decantable fluid under direct control of the differential pressure through the receiving means, and an indicating tube in communication with said holding means to receive and entrap decantable fluid from the holding means.

ARLINGTON P. LITTLE.